United States Patent Office 3,321,890
Patented May 30, 1967

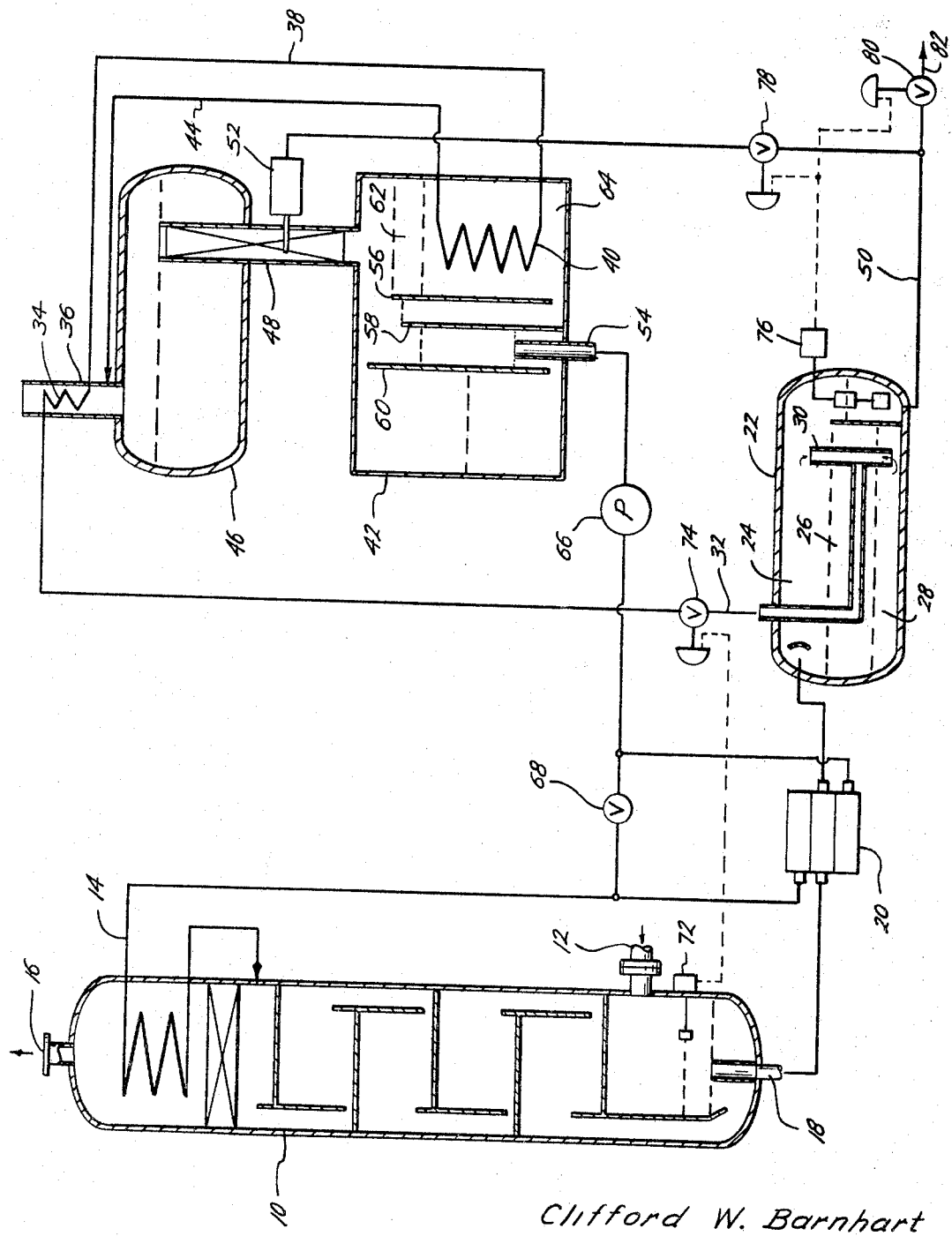

3,321,890
METHOD FOR DRYING A FLUID STREAM AND RECONCENTRATING THE ABSORBENT
Clifford Wayne Barnhart, Tulsa, Okla., assignor to Black, Sivalls & Bryson, Inc., Kansas City, Mo., a corporation of Delaware
Filed Mar. 1, 1965, Ser. No. 435,982
12 Claims. (Cl. 55—32)

The present invention relates to a method for drying a fluid stream and reconcentrating the absorbent, and more particularly, relates to a method for not only removing water from a natural gas stream but utilizing the liquid hydrocarbons in the gas stream to reconcentrate the absorbent and to further act to remove hydrocarbon vapors from the gas stream.

It is generally old to dry a natural gas stream by passing it into an absorber for contact with an absorbent such as glycol where the glycol acts to absorb water from the natural gas stream, such as shown in Patent No. 3,105,-748. However, the natural gas stream also includes liquid hydrocarbons and hydrocarbon vapors which decrease the efficiency of reconcentration of the absorbent.

It is a general object of the present invention to utilize the liquid hydrocarbons not only to purify the glycol but to provide a lean liquid hydrocarbon which can be used to absorb hydrocarbon vapors from the gas stream and provide an improved gas product from the absorber.

It is still a further object of the present invention to provide a method for reconcentrating a liquid absorbent such as glycol by removing the water rich absorbent and the liquid hydrocarbon from the absorber, separating the water rich absorbent from the hydrocarbon liquids, heating the water rich absorbent to reconcentrate the absorbent by boiling off the water, and utilizing the liquid hydrocarbons to reconcentrate the absorbent.

Still a further object of the present invention is the provision of a method for reconcentrating a liquid absorbent by removing a solution of water rich absorbent and liquid hydrocarbon and separating the solution into a water rich absorbent portion, a liquid hydrocarbon portion and a hydrocarbon vapor portion and thereafter heating the water rich absorbent and the hydrocarbon vapor portion to drive off the water and hydrocarbon vapors to reconcentrate the absorbent, and intimately contacting the reconcentrated absorbent with the liquid hydrocarbons to further reconcentrate the absorbent.

Still a further object of the present invention is the provision of a method for continuously drying a natural gas stream which includes water saturated natural gas and liquid hydrocarbons by the use of glycol in an absorber and removing the water rich glycol and liquid hydrocarbons from the absorber, reducing the pressure of the water rich glycol and liquid hydrocarbons, and separating the water rich glycol from the liquid hydrocarbon, heating the water rich absorbent to reconcentrate the glycol by boiling off the water, and intimately mixing the reconcentrated glycol with the liquid hydrocarbons at a further reduced pressure and high temperature to further reconcentrate the glycol and to boil off the volatile vapors from the liquid hydrocarbons to provide a stabilized liquid hydrocarbon, and then repressurizing the solution of reconcentrated glycol and liquid hydrocarbons to provide a lean glycol and a lean liquid hydrocarbon to the absorber which will not only remove water from the natural gas stream, but which will remove hydrocarbon vapors therefrom.

Yet still a further object of the present invention to provide a method for continuously drying a natural gas stream by utilizing the liquid hydrocarbons from the stream to not only reconcentrate the glycol but to process the liquid hydrocarbons to a lean stabilized hydrocarbon liquid for treating the natural gas stream to remove undesirable hydrocarbon vapors therefrom.

Other and further objects, features and advantages will be apparent from the following description of a presently-preferred embodiment of the invention given for the purpose of disclosure and taken in conjunction with the accompanying drawing, where like character references designate like parts throughout the several views and where The drawing is a schematic flow diagram of a system to dry a gas stream and to reconcentrate the absorbent.

Referring now to the drawing, the reference numeral 10 generally refers to a conventional absorber in which a fluid stream such as a natural gas stream generally including a water saturated gas and liquid hydrocaronbs enter the absorber inlet 12. An absorbent inlet line 14 is provided, as is conventional, to supply a suitable lean absorbent to the absorber 10 to contact the fluid stream and remove condensables therefrom. A dry gas outlet 16 is connected to the absorber 10 to convey the treated fluid stream which after absorption includes undersaturated gas relative to its water and hydrocarbon content. A liquid outlet 18 is provided at the absorber 10 for the removal of the water rich absorbent and liquid hydrocarbons. Preferably, the liquid hydrocarbons and water rich absorbent plus any vapors in a liquid phase, since they are relatively cool, are passed through a heat exchanger 20, which is in a heat exchange relationship to the absorbent inlet line 14 thereby cooling the lean absorbent returning to the absorber 10, and heating the liquid leaving the outlet 18 which tends to separate the various liquid components from the fluid outlet.

From the heat exchanger 20 the outlet liquid from the absorber 10 is conveyed through a separator 22, preferably operated at a lower pressure than the absorber whereby the fluid stream will be separated into a hydrocarbon vapor portion 24, a liquid hydrocarbon portion 26 and a water rich absorbent portion 28.

Suitable means such as conduit 30 which extends into the vapor portion 24 and the water rich absorbent portion 28 in the separator 22 and conduit 32 are provided to convey the hydrocarbon vapors and water rich absorbent to a heat exchanger 34 on top of a stripper column 36 and then by line 38 to another heat exchanger 40 in an accumulator 42 to cool the fluids in the accumulator, then through line 44 to stripper column 36 and into the reboiler 46. Of course, the hydrocarbon vapors 24 in the separator are not required to be flowed to the reboiler 46, but in fact can be used to provide the fuel for the reboiler or may be flowed to other locations. In the reboiler the glycol is boiled at temperatures up to 400° F. to reconcentrate the glycol and to boil off the water and hydrocarbon vapors. The hot reconcentrated glycol passes from the reboiler 46 into a stabilizer 48 which is of conventional structure.

The liquid hydrocarbons in the separator 22 are flowed through line 50 through a suitable flow control 52 and into the stabilizer 48. In the stabilizer 48 the liquid hydrocarbons are further reduced in pressure and on contacting the hot glycol in the stabilizer 48 are stabilized by driving off the volatile hydrocarbon vapors from the liquid hydrocarbons at the high temperatures and low pressures encountered in the stabilizer. In addition, the driven off hydrocarbon vapors are intimately mixed with the hot glycol in the stabilizer 48 to further purify and reconcentrate the glycol. Furthermore, the cool liquid hydrocarbons mix with and cool the hot glycol to reduce the cooling expenses required.

The combined solution of now reconcentrated glycol and stabilized liquid hydrocarbons passes into the accumulator 42 into a heat exchange relationship with the heat exchanger 40. Preferably, the accumulator 42 is a suitable surge tank having an outlet pipe 54 and baffles 56, 58 and 60 arranged so that the stabilized liquid hydrocarbons 62 which float on the heavier glycol 64 will flow over the baffles 56 and 58 so that a portion of each of the fluids 62 and 64 may be drawn off through outlet 54. From the accumulator outlet 54 the combined solution of reconcentrated glycol and stabilized liquid hydrocarbons is passed through pump 66 where this absorbent solution is repressurized causing the stabilized hydrocarbons to become undersaturated at the pressures involved. The solution of lean glycol and lean liquid hydrocarbons then flows to line 14, preferably through the heat exchanger 20, which is controlled by valve 68 and into the absorber 10. Of course, the lean glycol performs its usual function of removing water from the water saturated fluid gas flowing into the absorber inlet 12. However, the lean hydrocarbon liquids also serve to dry the natural gas stream by removing hydrocarbon vapors from the gas stream and thus provide an improved gas product flowing out the outlet 16 of the absorber 10.

The usual and conventional float and control valves such as 72 which controls valve 74 may be provided. And in the event that the amount of liquid hydrocarbons 26 in the separator 22 are more than sufficient for reconcentrating the glycol a suitable float and control system 76 may be utilized controlling valves 78 and 80 whereby any excess liquid hydrocarbons may be passed through line 82 to storage and further use.

The advantages of the above described system is that (1) the liquid hydrocarbons are removed from the glycol before the water rich glycol is passed through the reboiler and therefore the unnecessary expense of heating the liquid hydrocarbons, which serve no useful purpose in the reboiler, is avoided, (2) the cool liquid hydrocarbons are intimately mixed with the hot glycol in the stabilizer whereby the relatively useless highly volatile hydrocarbon vapors are used to further reconcentrate and purify the glycol, (3) the mixing of the liquid hydrocarbons with the glycol in the stabilizer acts to cool the glycol thereby decreasing heating expenses, and (4) since the liquid hydrocarbons are stabilized by driving off the volatile vapors at the high temperature and low pressures involved in the stabilizer, the liquid hydrocarbons themselves become stabilized and become undersaturated when pressurized at the pump so that they provide a lean hydrocarbon liquid which may be usefully used in the absorber for absorbing hydrocarbon vapors in the natural gas stream thereby producing an improved undersaturated gas stream at the outlet of the absorber which is undersaturated both as to water and hydrocarbons.

It is believed that the method of the present invention is apparent from the foregoing description of the apparatus of the invention. The method, however, comprehends the method of reconcentrating a solution of water rich absorbent liquid hydrocarbons by separating the solution into a water rich absorbent portion and a liquid hydrocarbon portion, heating the water rich absorbent portion to reconcentrate the absorbent by boiling off the water and intimately contacting the reconcentrated absorbent with the hydrocarbon portion to further reconcentrate the absorbent. The method further comprehends reconcentrating a liquid absorbent by reducing the pressure of the absorbent and separating the solution into a hydrocarbon vapor portion, a liquid hydrocarbon portion, and a water rich absorbent portion and heating the hydrocarbon vapor portion and water rich absorbent portion to drive off the hydrocarbon vapors and water to reconcentrate the absorbent, and intimately contacting the reconcentrated absorbent with the hydrocarbon liquid to further reconcentrate the absorbents.

The method further comprehends the process of continuously drying a gas stream which includes a water saturated natural gas and liquid hydrocarbons in which glycol is used to absorb water therefrom by removing and separating the water rich glycol and the liquid hydrocarbons from the fluid stream, heating and reconcentrating the glycol, and reducing the pressure and increasing the temperature of the liquid hydrocarbons and intimately contacting the liquid hydrocarbons with the heated glycol to further concentrate the glycol and to also stabilize the liquid hydrocarbons by driving off the volatile hydrocarbon vapors, and thereafter increasing the pressure of the combined solution of reconcentrated glycol and stabilized hydrocarbon liquids to provide a lean hydrocarbon liquid and contacting the gas stream with said solution whereby the glycol will absorb the water in the stream and the lean hydrocarbon liquids will absorb hydrocarbon vapors from the gas stream.

The present invention, therefore, is well adapted to carry out the objects and attain the ends and advantages mentioned as well as others inherent therein. While a presently-preferred embodiment of the invention is given for the purpose of disclosure, numerous changes in the details of construction, arrangement of parts, and steps of the process can be made which will readily suggest themselves to those skilled in the art and which are encompassed within the spirit of the invention and the scope of the appended claims.

What is claimed is:

1. The method of reconcentrating a solution of water rich absorbent, and liquid hydrocarbons comprising,
   separating the solution into a water rich absorbent portion and a liquid hydrocarbon portion,
   heating the water rich absorbent portion to reconcentrate the absorbent by boiling off the water, said rich absorbent portion being heated sufficiently to partially vaporize the liquid hydrocarbon portion upon subsequent contact therewith and
   intimately contacting the reconcentrated absorbent with the vaporized liquid hydrocarbon portion to further concentration of the absorbent.

2. The method of claim 1 including,
   after separation of the solution removing the excess liquid hydrocarbon condensate not needed for reconcentration of the absorbent.

3. The method of reconcentrating a solution of water rich absorbent, liquid hydrocarbons, and hydrocarbon vapors comprising,
   separating the solution into a water rich absorbent portion, a liquid hydrocarbon portion, and a hydrocarbon vapor portion,
   recombining and heating the water rich absorbent portion and the separated hydrocarbon vapor portion to drive off the water and hydrocarbon vapors and to reconcentrate the absorbent, said rich absorbent portion being heated sufficiently to partially vaporize the liquid hydrocarbon portion upon subsequent contact therewith, and
   intimately contacting the reconcentrated absorbent with the vaporized liquid hydrocarbon condensate portion to further reconcentrate the absorbent.

4. The method of continuously drying a gas stream with a liquid absorbent comprising,
   contacting the gas stream with a liquid absorbent in an absorber to dry the gas,
   removing a solution of water rich absorbent, hydrocarbon vapors, and liquid hydrocarbons from the absorber,
   separating the combined solution into a water rich absorbent portion, a liquid hydrocarbon condensate portion, and a hydrocarbon vapor portion,
   recombining and heating the water rich absorbent portion and the separated hydrocarbon vapor portion to boil off the water and the hydrocarbon vapors thereby reconcentrating the absorbent, and said rich absorbent portion being heated sufficiently to partially vaporize the liquid hydrocarbon portion upon subsequent contact therewith
   intimately mixing the hot reconcentrated absorbent with the vaporized liquid hydrocarbon portion to further reconcentrate the absorbent, and passing the reconcentrated absorbent in heat exchange relationship with the solution removed from the absorber.

5. The method of continuously drying a gas stream containing water saturated gas and liquid hydrocarbons by a liquid absorbent comprising, contacting the gas stream with a liquid absorbent in an absorber to dry the gas, removing the water rich absorbent and liquid hydrocarbons from the absorber, separating the water rich absorbent from the liquid hydrocarbon, heating the water rich absorbent to reconcentrate the absorbent by boiling off the water, said rich absorbent portion being heated sufficiently to partially vaporize the liquid hydrocarbon portion upon subsequent contact therewith, intimately contacting the hot reconcentrated absorbent with the vaporized liquid hydrocarbon condensate to further reconcentrate the absorbent, and to provide a solution of highly concentrated absorbent and stabilized liquid hydrocarbons, and contacting the gas stream with said solution whereby the absorbent will absorb water from the gas stream and the stabilized liquid hydrocarbons will absorb hydrocarbon vapors from the gas stream.

6. The method of continuously drying a gas stream containing water and liquid hydrocarbons in which glycol is used to absorb water therefrom comprising, removing water rich glycol and liquid hydrocarbons from the stream, separating the water rich glycol from the liquid hydrocarbons, heating the water rich glycol to reconcentrate the glycol by boiling off the water said glycol being heated sufficiently to partially vaporize the liquid hydrocarbon portion upon subsequent contact therewith, intimately contacting the hot reconcentrated glycol with the vaporized liquid hydrocarbons to further reconcentrate the glycol and to stabilize the liquid hydrocarbons to provide a lean liquid hydrocarbon, and contacting the gas stream with the solution of reconcentrated glycol and the lean liquid hydrocarbon whereby the glycol will absorb water and the lean hydrocarbon will absorb hydrocarbon vapors from the gas stream.

7. The method of continuously drying a fluid stream containing water saturated gas and liquid hydrocarbons in which glycol is used to absorb water therefrom comprising, removing the water rich glycol and liquid hydrocarbons from said stream, separating the water rich glycol from the liquid hydrocarbons, heating the water rich glycol to reconcentrate the glycol by boiling off the water, said glycol being heated sufficiently to partially vaporize the liquid hydrocarbon portion upon subsequent contact therewith, intimately contacting the vaporized liquid condensate with the heated glycol and reducing the pressure and increasing the temperature of the liquid hydrocarbons to further reconcentrate the glycol and to also stabilize the liquid hydrocarbons by driving off the volatile hydrocarbon vapors, increasing the pressure of the combined solution of reconcentrated glycol and stabilized liquid hydrocarbons, and contacting the fluid stream with said solution whereby the glycol will absorb water in the stream and the the liquid hydrocarbons will absorb hydrocarbon vapors from the gas stream.

8. The method of continuously drying a fluid stream containing water saturated gas and liquid hydrocarbons in which glycol is used to absorb water in an absorber to dry the stream, comprising, removing water rich glycol and liquid hydrocarbon condensate from the absorber, removing water rich glycol and liquid hydrocarbon condensate from the absorber, reducing the pressure of the water rich glycol and liquid hydrocarbons and separating them into a water rich glycol portion, a hydrocarbon vapor portion, and a liquid hydrocarbon portion, recombining and heating the water rich glycol portion and the separated hydrocarbon vapor portion to reconcentrate the glycol by boiling off the water and hydrocarbon vapors, said glycol portion being heated sufficiently to partially vaporize the liquid hydrocarbon portion upon subsequent contact therewith, further reducing the pressure and increasing the temperature of the liquid hydrocarbon condensate and intimately contacting the vaporized liquid hydrocarbons with the heated glycol to further reconcentrate the glycol and to also stabilize the liquid hydrocarbons by driving off the volatile hydrocarbon vapors therefrom, increasing the presence of the combined solution of reconcentrated glycol and the stabilized liquid hydrocarbons, and contacting the fluid stream in the absorber with the solution whereby the glycol will absorb water in the stream and the stabilized liquid hydrocarbons will absorb hydrocarbon vapors from the gas stream.

9. In the method of continuously drying a gas stream with a liquid absorbent wherein the gas stream is contacted with a liquid absorbent in an absorber to dry the gas and a combined solution of water rich absorbent, hydrocarbon vapors and liquid hydrocarbons is removed from the absorber, the improvement comprising, separating the combined solution into a water rich absorbent, a liquid hydrocarbon condensate portion, and a hydrocarbon vapor portion, recombining and heating the water rich absorbent portion and the separated vapor portion to boil off the water and the hydrocarbon vapors thereby reconcentrating the absorbent, said rich absorbent portion being heated sufficiently to partially vaporize the liquid hydrocarbon portion upon subsequent contact therewith, intimately mixing the hot reconcentrated absorbent with the vaporized liquid hydrocarbon portion to further reconcentrate the absorbent, and passing the reconcentrated absorbent in heat exchange relationship with the solution removed from the absorber.

10. In the method of continuously drying a gas stream containing water saturated gas and liquid hydrocarbons by a liquid absorbent wherein the gas stream is contacted with a liquid absorbent in an absorber to dry the gas and the water rich absorbent and liquid hydrocarbons are removed from the absorber, the improvement comprising, separating the water rich absorbent from the liquid hydrocarbon, heating the water rich absorbent to reconcentrate the absorbent by boiling off the water, said rich absorbent portion being heated sufficiently to partially vaporize the liquid hydrocarbon portion upon subsequent contact therewith, intimately contacting the hot reconcentrated absorbent with the vaporized liquid hydrocarbon condensate to further reconcentrate the absorbent, and to provide a solution of highly concentrated absorbent and stabilized liquid hydrocarbons, and contacting the gas stream with said solution whereby the absorbent will absorb water from the gas stream and the stabilized liquid hydrocarbons will absorb hydrocarbon vapors from the gas stream.

11. In the method of continuously drying a gas stream containing water and liquid hydrocarbons in which glycol is used to absorb water therefrom and wherein the water rich glycol and liquid hydrocarbons are removed from the stream, the improvement comprising, separating the water rich glycol from the liquid hydrocarbons, heating the water rich glycol to reconcentrate the glycol by boiling off the water, said glycol being heated sufficiently to partially vaporize the liquid hydrocarbon portion upon subsequent contact therewith, intimately contacting the hot reconcentrated glycol with the vaporized liquid hydrocarbons to further reconcentrate the glycol and to stabilize the liquid hydrocarbons to provide a lean liquid hydrocarbon, and contacting the gas stream with the solution of reconcentrated glycol and the lean liquid hydrocarbon whereby the glycol will absorb water and the lean hydrocarbon will absorb hydrocarbon vapors from the gas stream.

12. In the method of continuously drying a fluid stream containing water saturated gas and liquid hydrocarbons in which glycol is used to absorb water in an absorber to dry the stream and wherein water rich glycol and liquid hydrocarbon condensate are removed from the absorber, the improvement, comprising, reducing the pressure of the water rich glycol and liquid hydrocarbons and separating them into a water rich glycol portion, a hydrocarbon vapor portion, and a liquid hydrocarbon portion, recombining and heating the water rich glycol portion and the separated hydrocarbon vapor portion to reconcentrate the glycol by boiling off the water and hydrocarbon vapors, said glycol portion being heated sufficiently to partially vaporize the liquid hydrocarbon portion upon subsequent contact therewith, further reducing the pressure and increasing the temperature of the liquid hydrocarbon condensate and intimately contacting the vaporized liquid hydrocarbons with the heated glycol to further reconcentrate the glycol and to also stabilize the liquid hydrocarbons by driving off the volatile hydrocarbon vapors therefrom, increasing the pressure of the combined solution of reconcentrated glycol and the stabilized liquid hydrocarbons, and contacting the fluid stream in the absorber with the solution whereby the glycol will absorb water in the stream and the stabilized liquid hydrocarbons will absorb hydrocarbon vapors from the gas stream.

References Cited
UNITED STATES PATENTS

| | | | |
|---|---|---|---|
| 2,690,814 | 10/1954 | Reid | 55—32 |
| 2,990,910 | 7/1961 | Kimmell | 55—32 |
| 3,105,748 | 10/1963 | Stahl | 55—32 |
| 3,182,434 | 5/1965 | Fryar | 55—196 |
| 3,253,390 | 5/1966 | Connors | 55—32 |

REUBEN FRIEDMAN, *Primary Examiner.*

C. N. HART, *Assistant Examiner.*